(12) United States Patent
Draznin et al.

(10) Patent No.: US 8,989,000 B2
(45) Date of Patent: Mar. 24, 2015

(54) CLOUD-BASED TELECOMMUNICATIONS INFRASTRUCTURE

(71) Applicant: Verizon Patent and Licensing Inc., Arlington, VA (US)

(72) Inventors: Sagiv Draznin, Walnut Creek, CA (US); Patricia R. Chang, San Ramon, CA (US); Lalit R. Kotecha, San Ramon, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 120 days.

(21) Appl. No.: 13/693,722

(22) Filed: Dec. 4, 2012

(65) Prior Publication Data
US 2014/0153481 A1   Jun. 5, 2014

(51) Int. Cl.
*H04L 12/28*     (2006.01)
*H04W 4/00*      (2009.01)
*G06F 15/177*    (2006.01)
*H04W 40/02*     (2009.01)
*H04W 24/04*     (2009.01)

(52) U.S. Cl.
CPC .............. *H04W 40/02* (2013.01); *H04W 24/04* (2013.01)
USPC ............ 370/230; 370/328; 370/400; 709/229

(58) Field of Classification Search
CPC ...... H04W 12/08; H04W 28/02; H04W 12/06; H04W 48/18; H04W 76/02; H04W 48/00; H04W 48/20; H04W 24/04; H04W 28/00; H04W 28/16; H04W 40/02; H04W 88/18; H04L 47/2408; H04L 63/08; H04L 63/10; H04L 9/32; H04L 67/327
USPC ................. 370/229–238, 310–350, 400–401; 709/217–222, 227–237
See application file for complete search history.

(56) References Cited

U.S. PATENT DOCUMENTS

| | | | | |
|---|---|---|---|---|
| 8,621,058 | B2 * | 12/2013 | Eswaran et al. | 709/223 |
| 8,804,520 | B2 * | 8/2014 | Cortes Gomez | 370/235 |
| 8,867,361 | B2 * | 10/2014 | Kempf et al. | 370/236 |
| 8,873,398 | B2 * | 10/2014 | Kempf et al. | 370/236 |
| 2012/0209947 | A1 * | 8/2012 | Glaser et al. | 709/217 |
| 2012/0331050 | A1 * | 12/2012 | Wilbur et al. | 709/204 |
| 2013/0121207 | A1 * | 5/2013 | Parker | 370/254 |
| 2013/0294403 | A1 * | 11/2013 | Srinivasan | 370/331 |
| 2013/0336286 | A1 * | 12/2013 | Anschutz | 370/331 |
| 2014/0052773 | A1 * | 2/2014 | Deng et al. | 709/203 |
| 2014/0082699 | A1 * | 3/2014 | Eicken et al. | 726/4 |
| 2014/0086150 | A1 * | 3/2014 | Lynch et al. | 370/328 |
| 2014/0153400 | A1 * | 6/2014 | Lee et al. | 370/238 |

* cited by examiner

*Primary Examiner* — Tri H Phan (57) ABSTRACT

A cloud-based telecommunications infrastructure may include one or more cloud-based network instances that each provide telecommunications services to mobile devices. A proxy may be used to select, based on initial communications from the mobile devices, one of the cloud-based network instances to service the mobile devices. Communications to the mobile devices may then be routed to the selected cloud-based network instances.

21 Claims, 8 Drawing Sheets

Fig. 7 ized computing resources in which functionality, and possibly data, may be abstracted from physical computing hardware at the computing resources.

CLOUD-BASED TELECOMMUNICATIONS INFRASTRUCTURE

BACKGROUND

A telecommunications network, such as a cellular telecommunications network, may enable communications between users of mobile devices or other terminals that are connected to the telecommunication network. A telecommunications network may include nodes, connected by links, which transmit data through the telecommunications network, using, for example, packet switched routing.

An example of a telecommunications network is one implemented using the long term evolution (LTE) mobile communication standard. An LTE network may be based on an Internet Protocol (IP) system, in which all data is packet switched. Various nodes (e.g., network devices) in the LTE network may perform control, policy, and gateway functions for the LTE network. In existing LTE networks, the nodes of the LTE network may be physically implemented in or near the geographic service area of the network. For example, an LTE mobility management entity may be implemented in or near a base station that connects, via a radio interface, to one or more mobile devices.

DETAILED DESCRIPTION OF PREFERRED EMBODIMENTS

The following detailed description refers to the accompanying drawings. The same reference numbers in different drawings may identify the same or similar elements.

Techniques described herein may provide for infrastructure in a telecommunications network to be implemented using commoditized and networked computing resources (i.e., in the cloud). For example, in an LTE network using the IP Multimedia Subsystem (IMS) standard, network devices, such as the mobility management entity (MME), serving gateway (SGW), and packet data network gateway (PGW), may be implemented by the cloud. Implementing portions of the telecommunications network in the cloud may increase flexibility and resiliency of the network. For example, different cloud instances may be allocated to different customers or groups of users of the telecommunications network. Additionally, cloud resources can be dynamically added or removed as needed, based on the load of the network.

With some existing telecommunications networks, such as for some existing cellular networks, network equipment used to support a particular geographic area may be physically located in or near the geographic area. Failure of the network equipment, such as failure due to a weather event (e.g., a hurricane) or other localized event may cause failure of the telecommunications network in that geographic area. In contrast, with the techniques described herein, resiliency in the telecommunications network can be achieved, as network equipment implemented by failing cloud components may be implemented by different, possibly geographically distant, cloud instances.

Figure 1:
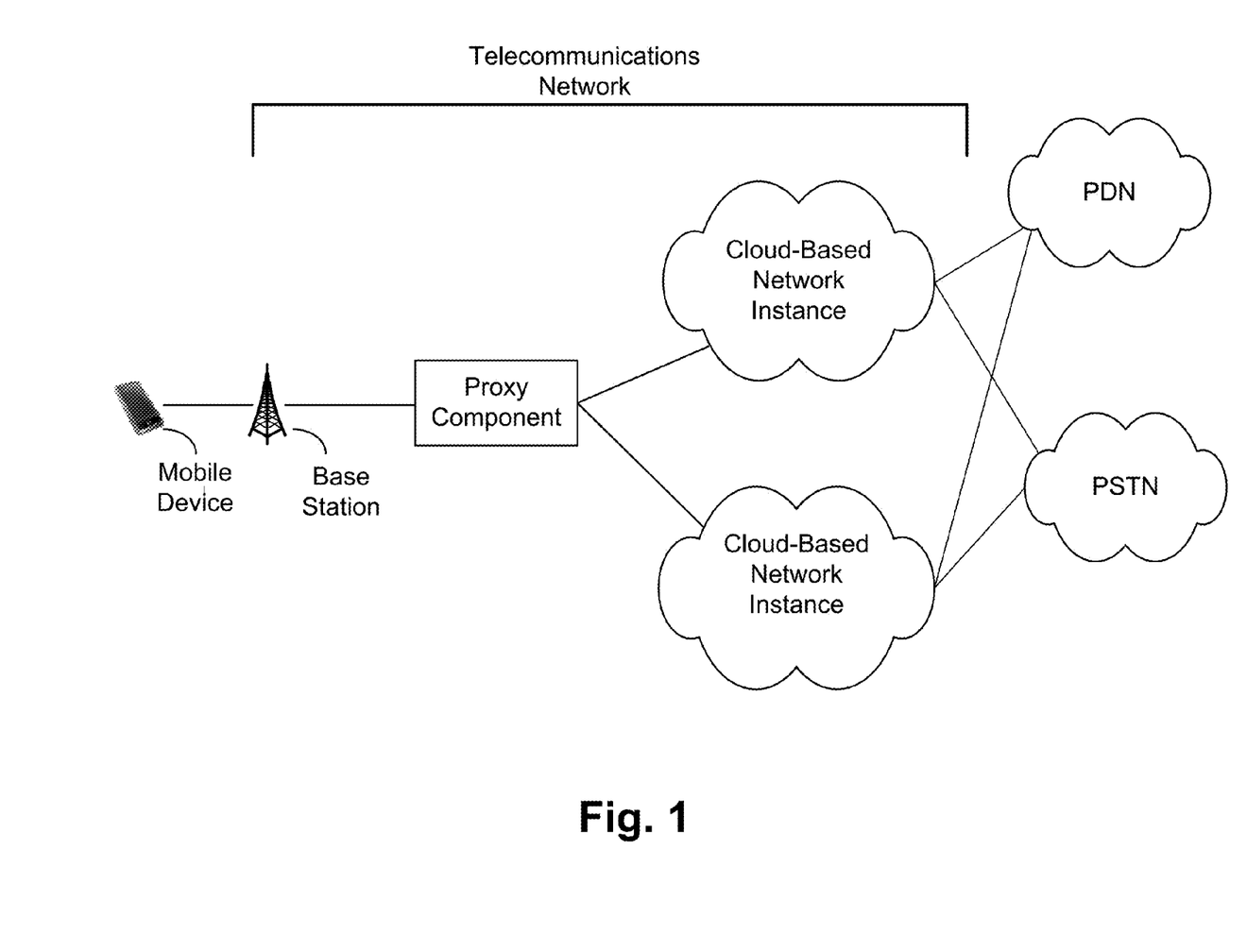
FIG. 1 is a diagram conceptually illustrating an example of an overview of concepts described herein.

FIG. 1 is a diagram conceptually illustrating an example of an overview of concepts described herein. As shown in FIG. 1, a mobile device, such as a cellular phone, may connect to a telecommunications network, such as a cellular network, via a radio interface (illustrated as a base station in FIG. 1). The telecommunications network may connect the user of the mobile device to one or more other end-users or end-services. For example, the cellular network may connect the mobile device to a public switched telephone network (PSTN) to complete a voice call with another user or to a packet data network (e.g., the Internet) to connect to a web server or other service.

The telecommunications network may include, in addition to the base station, a proxy component, and one or more cloud-based network instances. Consistent with aspects described herein, each of the cloud-based network instances may include control, routing, or other logic that may normally be included in network devices located in proximity to a geographic area (such as the geographic area near the antenna). Unlike fixed, physical network devices, the capacity of each of the cloud-based network instances may be dynamically managed. Additionally, in response to disruptions (e.g., hardware failure, natural disasters, etc.) of the physical location of data centers that run the cloud-based network instances, the cloud-based network instances may be switched to data centers located at different physical locations.

The proxy component illustrated FIG. 1 may be used to route network traffic to different cloud-based network instances. Certain users, or certain groups of users may be assigned to different cloud-based network instances. For example, all users associated with a particular account, customer, or traffic class, may be assigned to a particular one of the cloud-based network instances. In other implementations, other factors may be used to assign a particular user to a particular cloud-based network instance, such as: a user subscription level (e.g., gold, silver, bronze), time (e.g., time of day), date (e.g., date of the year or season), user location (e.g., shopping center, stadium, etc.), type of radio access network, parameters relating to a device of the user (e.g., codec's supported), and/or application type (gaming, surfing, video, etc.). Although the proxy component is shown as being outside the cloud-based network instances, in some implementations, the proxy component may itself be implemented by one or more cloud-based network instances.

As an example of one possible implementation of the cloud-based network instances, consider an LTE-based network using the IMS standard. In this case, the cloud-based network instances may each include functionality to perform the functions of, for example, a MME, SGW, and/or PGW. Additionally, in this case, the base station (which may be referred to as an Evolved Node B (eNodeB) in the context of an LTE system), may be implemented such that functionality of the base station that can be performed remotely may also be implemented in the cloud-based network instances. For example, the antenna and other radio circuitry may continue to be implemented at the eNodeB, while higher-level functionality of the eNodeB may be implemented in the cloud-based network instances.

The terms "cloud," "cloud instance," and "computing cloud," as used herein, may generally refer to computing resources offered by a provider, as a service. Data centers that implement cloud resources are frequently implemented using commoditized and networked computing resources in which virtual computing instances may each be allocated from one or more physical computing devices. A user of a cloud service may dynamically manage the amount of computing resources (e.g., processor and storage resources) that are assigned to the software applications of the user.

Figure 2:
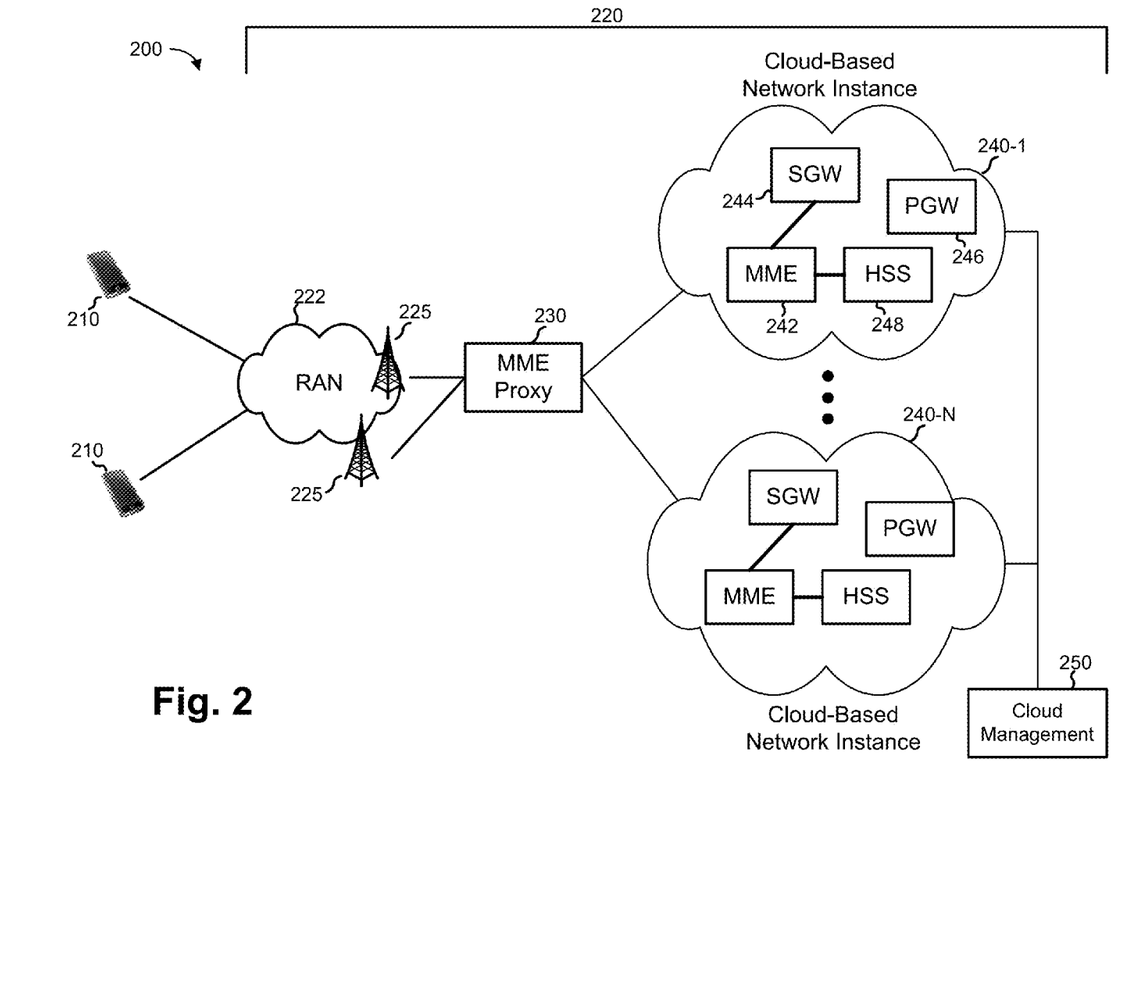
FIGS. 2-4 are diagrams of example environments in which systems and/or methods described herein may be implemented.

FIG. 2 is a diagram of an example environment 200 in which systems and/or methods described herein may be implemented. As illustrated, environment 200 may include one or more mobile devices 210 and a telecommunications network 220.

Mobile devices 210 may include portable computing and communication devices, such as personal digital assistants (PDAs), smart phones, cellular phones, laptop computers with connectivity to a cellular wireless network, tablet computers, etc. Mobile devices 210 may also include non-portable computing devices, such as desktop computers, consumer or business appliances, set-top devices (STDs), or other devices that have the ability to connect to cellular network 220. Mobile devices 210 may connect, through a radio link, to cellular network 220. Through the radio link, mobile devices 210 may obtain data and/or voice services.

Telecommunications network 220 may include one or more devices that include radio interfaces to provide wireless connections to mobile devices 210. In addition, telecommunications network 220 may provide core functionality relating to creating and managing communications with mobile devices 210. In one implementation, telecommunications network 220 may include a long term evolution (LTE) network. In this situation, telecommunications network 220 may be implemented using a flat, IP-based network architecture that includes one or more network devices or components that facilitate the providing of network access to mobile devices 210. In other implementations, other types of telecommunications networks may be implemented. Telecommunications network 220, as illustrated, may include a radio access network (RAN) 222, one or more base stations 225, an MME proxy 230, and one or more cloud-based network instances 240-1 through 240-N (which may be referred to collectively as cloud-based instances 240 or singularly, in reference to one of cloud-based instances 240, as cloud-based instance 240). As is further illustrated in FIG. 2, telecommunications network 220 may further include cloud management component 250 to manage and/or monitor the deployment of cloud-based network instances 240.

RAN 222 may represent the radio interface between mobile devices 210 and base station 225. RAN 222 may include, for example, orthogonal frequency-division multiplexing (OFDM) and/or single-carrier frequency-division multiple access (SC-FDMA) SC-FDMA based radio interfaces. RAN 222 may be implemented by radio modems in mobile devices 210 and corresponding radio modems implemented by base stations 225.

As previously mentioned, in the context of an LTE network, a particular base station 225 may be referred to as an eNodeB. Each base station 225 may provide a radio interface with which the base station may communicate with mobile devices 210. For example, each base station 225 may include one or more antennas and transceiver circuitry (e.g., radio modems) related to the interfacing and driving of the radio interface. In some implementations, base stations 225 may be implemented such that control functionality, which may be traditionally performed by eNodeBs, but that can be performed remotely, may not be implemented within base station 225. For example, the antenna and other radio circuitry may be implemented in base station 225, while higher-level functionality of the base station may be implemented in MME proxy 230 and/or cloud-based network instances 240.

MME proxy 230 may include one or more computation and communication devices that are used to route network traffic to different cloud-based network instances. MME proxy 230 may additionally perform some or all of the signaling and control functions traditionally performed by an MME in the evolved packet core (EPC) of an LTE-based architecture. MME proxy 230 may, for example, be responsible for authenticating mobile devices 210, maintaining location information for mobile devices 210, performing idle mode tracking and paging, performing bearer activation/deactivation, and assigning a particular mobile device to a particular SGW.

Cloud-based network instances 240 may each correspond to one or more devices, such as computer servers or other computing resources, that are provided as a service. Each cloud-based network instance 240 may correspond to, for example, one or more software applications hosted at a data center. Multiple cloud-based network instances 240 may be hosted by the same data center. Alternatively or additionally, different, potentially geographically distributed, data centers may host different cloud-based network instances 240.

As described herein, each of cloud-based network instances 240 may include control, routing, or other logic that may normally be included in network devices located in proximity to a geographic area (such as the geographic area near the antenna of a base station). As shown in FIG. 2, each cloud-based network instance 240 may include functionality corresponding to an MME 242, a SGW 244, a PGW 246, and/or a home subscriber server (HSS) 248. In some implementations, the function of MME 242, SGW 244, PGW 246, and/or HSS 248 may be implemented in software.

MME 242 may perform some or all of the functions relating to signaling and control in the EPC of an LTE-based architecture. In some implementations, each MME 242 may operate in conjunction with MME proxy 230 to perform functions of a stand-alone MME. MME 242 may, for example, be responsible for authenticating mobile devices 210, maintaining location information for mobile devices 210, performing idle mode tracking and paging, performing bearer activation/deactivation, and assigning a particular mobile device to a particular SGW.

SGW 244 may operate to perform routing and forwarding of user data packets. SGW 244 may route and forward user packets and also act as a mobility anchor during inter-base station handoffs. For idle state mobile devices, SGW 244 may terminate the downlink data path and trigger paging when downlink data arrives at a mobile device 210.

PGW 246 may provide connectivity from mobile devices 210 to external PDNs. PGW 246 may provide connectivity from mobile devices 210 to a PDN by being the point of exit and entry of traffic for mobile devices 210. PGW 246 may perform policy enforcement, packet filtering, and charging support.

HSS 248 may represent a database that contains user-related and/or subscription-related information. HSS 248 may be used in functions such as a mobility management, call and session establishment support, and user authentication and access authorization.

Cloud management component 250 may include one or more devices to manage cloud-based network instances 240. Cloud management component 250 may, for example, dynamically create new cloud-based network instances 240, terminate existing cloud-based network instances 240, and/or expand or reduce the capacity of existing cloud-based network instances 240. In one implementation, cloud management component 250 may manage cloud-based network instances 240 based on the load associated with cloud-based network instances 240. For example, card management component 250 may allocate additional computing resources (e.g., additional processing or storage resources) to a particular cloud-based network instance 240 when the particular cloud-based network instance 240 becomes highly loaded. In some implementations, cloud management component 250 may function automatically to manage the capacities of cloud-based network instances 240. Alternatively or additionally, a network administrator can control cloud management component 250 to manage the capacities of cloud-based network instances 240.

Figure 3:
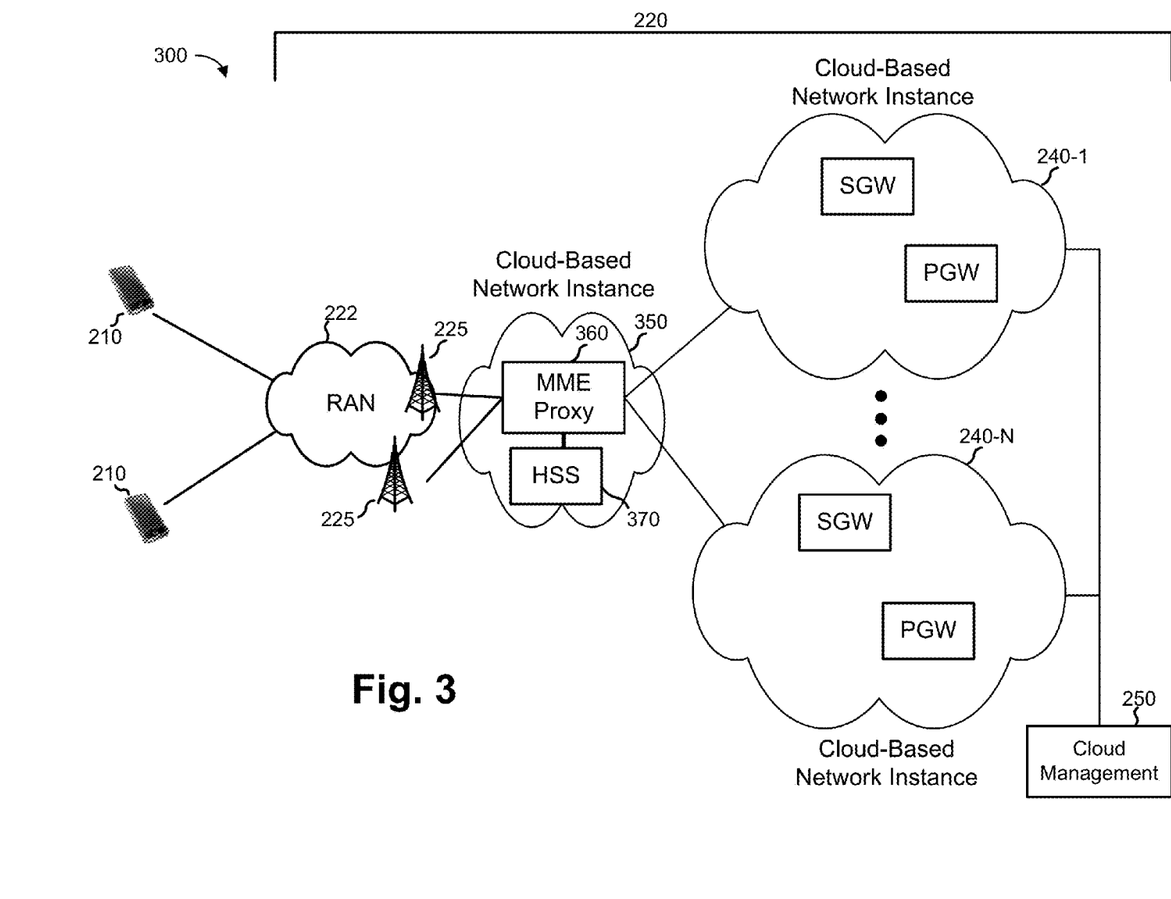

FIG. 3 is a diagram of an example environment 300 in which systems and/or methods described herein may be implemented. Environment 300 may be similar to environment 200. In environment 300, however, the steering/selecting function of MME proxy 230 may be implemented in a cloud-based network instance, illustrated as cloud-based network instance 350. As shown, cloud-based network instance 350 may include MME proxy 360 and HSS 370. In this implementation, the functionality of MMEs 242 and HSSs 248, instead of being performed in cloud-based network instances 240, may be performed in cloud-based network instance 350.

MME proxy 360, similar to MME proxy 230, may route network traffic to different cloud-based network instances 240. MME proxy 360 may additionally perform some or all of the signaling and control functions traditionally performed by an MME in the evolved packet core (EPC) of an LTE-based architecture. HSS 370 may contain user-related and/or subscription-related information. MME proxy 360 may, for example, communicate with HSS 370 when determining which cloud-based network instance 240 to use for a particular mobile device 210.

Advantageously, by placing MME proxy 360 and/or HSS 370 in a cloud-based network instance, as shown in FIG. 3, scalability and resiliency, provided by cloud-based network instances, may also be extended to the routing/steering function of the MME proxy.

Figure 4:
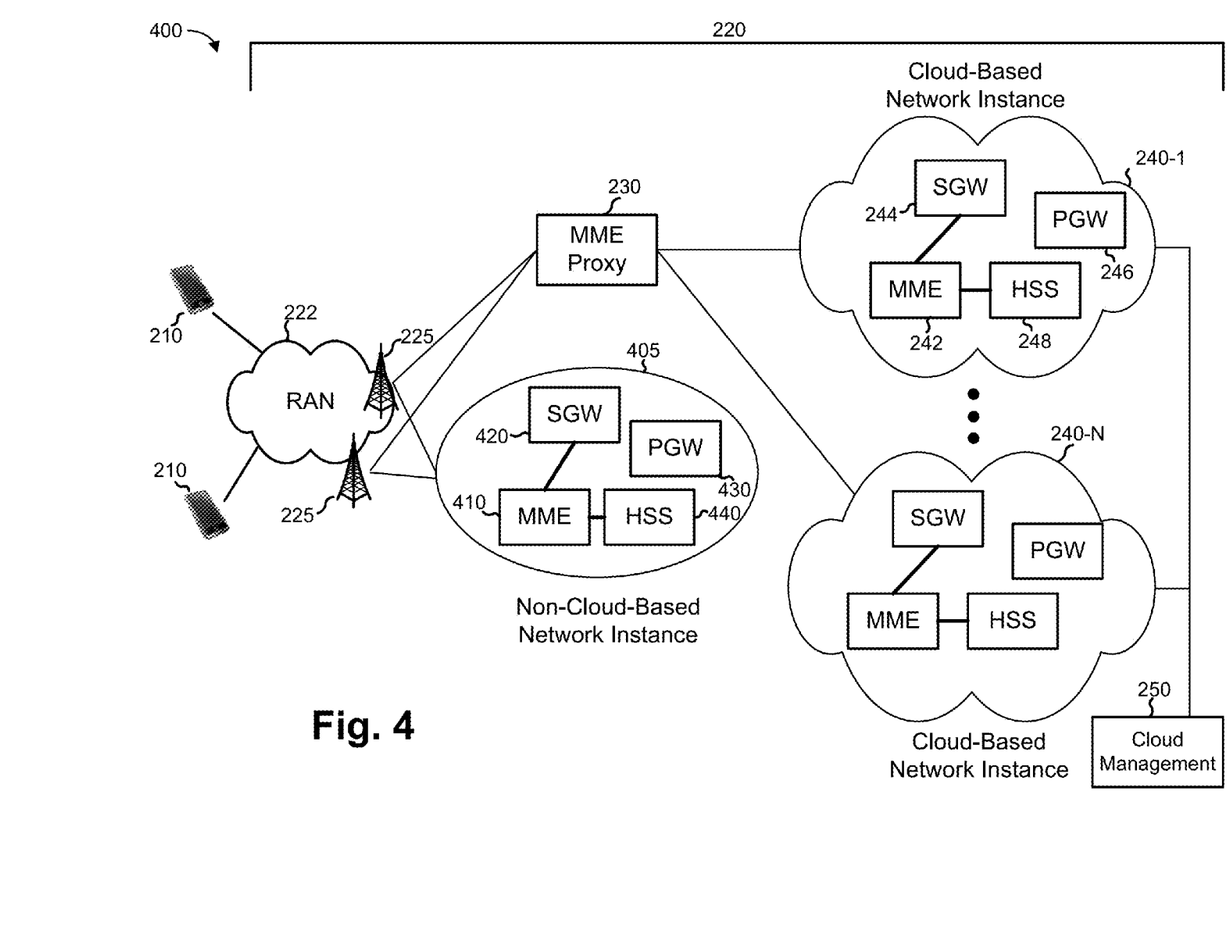

FIG. 4 is a diagram of an example environment 400 in which systems and/or methods described herein may be implemented. Environment 400 may be similar to environment 200. In environment 400, however, a non-cloud-based network instance 405 may be implemented. Non-cloud-based network instance 405 may include network equipment that includes one or more dedicated network devices, servers, or other devices that implement network infrastructure. In some implementations, the network equipment used to support a particular geographic area (e.g., the area around one of bases stations 225) may be physically located in or near the geographic area.

As shown in FIG. 4, environment 400 may include, for example, one or more of MME 410, SGW 420, PGW 430, and HSS 440. MME 410, SGW 420, PGW 430, and HSS 440 may be implemented as, for example, dedicated network devices, servers, or other devices. MME 410, SGW 420, PGW 430, and HSS 440 may implement functionality similar to MME 242, SGW 244, PGW 246, and HSS 248, respectively. For example, MME 410 may perform some or all of the functions relating to signaling and control in the EPC of an LTE-based architecture. SGW 420 may operate to perform routing and forwarding of user data packets. PGW 430 may provide connectivity from mobile devices 210 to external PDNs. HSS 440 may represent a database that contains user-related and/or subscription-related information.

In some implementations, non-cloud-based network instance 405 may operate as the primary telecommunications network for mobile devices 210. For example, non-cloud-based network instance 405 may connect to base stations 205 to provide cellular network services to mobile devices 210. In this implementation, MME proxy 230 and cloud-based network instances 240 may function in a backup capacity for non-cloud-based network instance 405. When a failure occurs in non-cloud-based network instance 405, such as a failure of one or more network devices due to a weather event (e.g., flooding), cloud-based network instances 240 may be activated to provide cellular network services to mobile devices 210. As another example, non-cloud-based network instance 405 may function as a primary telecommunications network for mobile devices 210, and cloud-based network instances 240 may be used in an overflow capacity. For example, cloud-based network instances 240 may be used to handle network traffic when non-cloud network instance 405 is overburdened. As another example, non-cloud-based network instance 405 and cloud-based network instances 240 may be simultaneously used. For instance, cloud-based network instance 240 may be used to provide certain functionality, such as new services or features, that may not have yet been incorporated into non-cloud-based network instance 405.

Although FIGS. 2-4 illustrate example components of environments 200, 300, and 400, in other implementations, environments 200, 300, and 400 may contain fewer components, different components, differently arranged components, or additional components than those depicted in FIGS. 2-4. For example, each cloud-based network instance 240 may include functionality relating to other or additional network devices, such as an ANDSF (Access Network Discovery and Selection Function) and an ePDG (Evolved Packet Data Gateway). Alternatively, or additionally, one or more components of environments 200, 300, and 400 may perform one or more other tasks described as being performed by one or more other components of environments 200, 300, and 400.

Figure 5:
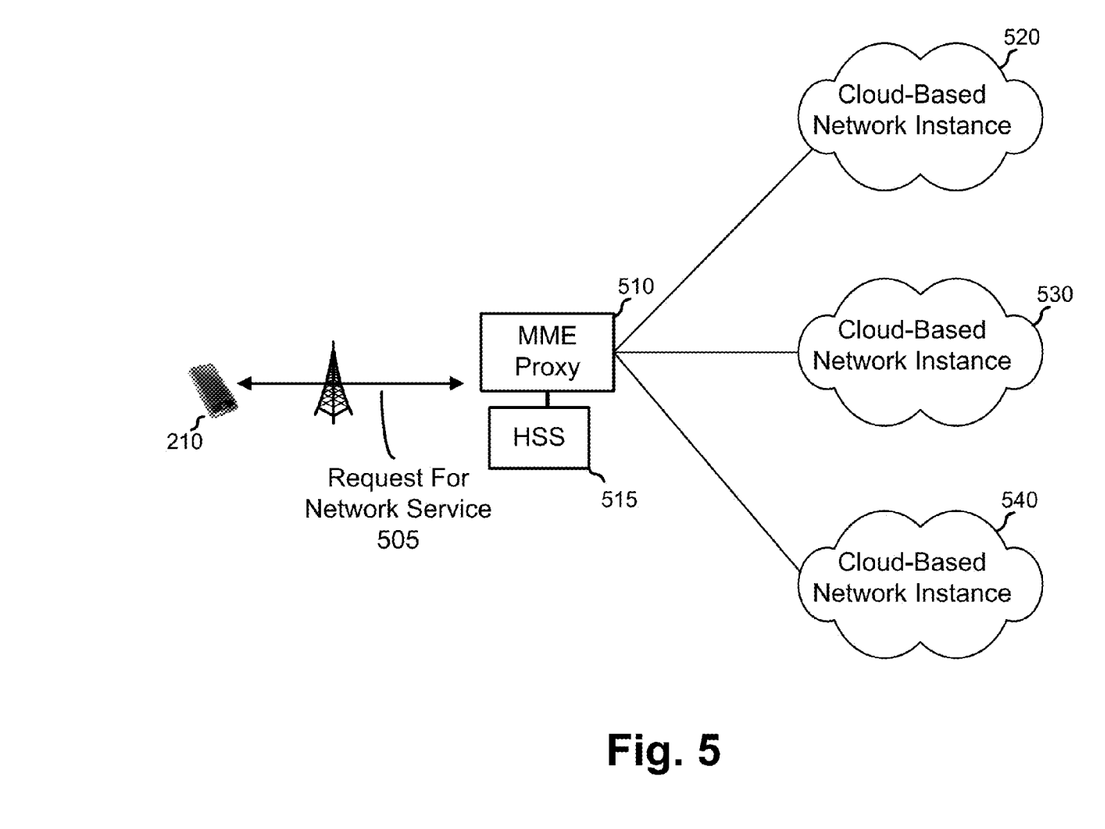
FIG. 5 is a diagram conceptually illustrating the use of different cloud-based instances based on a connecting mobile device.

FIG. 5 is a diagram conceptually illustrating the use of different cloud-based instances based on a connecting mobile device. The diagram of FIG. 5 may correspond to an environment similar to that shown in FIG. 2 or 3.

As illustrated in FIG. 5, MME proxy 510 may steer network service requests 505, from mobile devices 210, to one of a number of cloud-based network instances, illustrated as cloud-based network instance 520, cloud-based network instance 530, and cloud-based network instance 540. In this example, assume that each cloud-based network instance 520-540 is assigned to a particular customer of a telecommunications company that operates a cellular network. For example, cloud-based network instance 520 may be assigned to mobile devices associated with a first customer, cloud-based network instance 530 may be assigned to mobile devices associated with a second customer, and cloud-based network instance 540 may be assigned to mobile devices associated with a third customer. In other implementations, other criteria may be used to assign a mobile device to a cloud-based network instance, such as a type of mobile device, a service-level subscribed to by the mobile device, or other criteria. In some implementations, the cloud-based network instance to use may be selected based on a type of service being requested by mobile device 210. In this situation, a mobile device 210 requesting the use of multiple different services may be assigned to different cloud-based network instances 520-540 based on the service being used by mobile device 210.

In response to request for network service 505, from mobile device 210, MME proxy 510 may look up, at HSS 515, account information or other information, relating to mobile device 210. This information can be used to determine the appropriate cloud-based network instance 520-540 for mobile device 210. Based on the determination of the appropriate cloud-based network instance, MME proxy 510 may route network traffic corresponding to the mobile device to the appropriate cloud-based network instance (e.g., one of cloud-based network instances 520-540).

Figure 6:
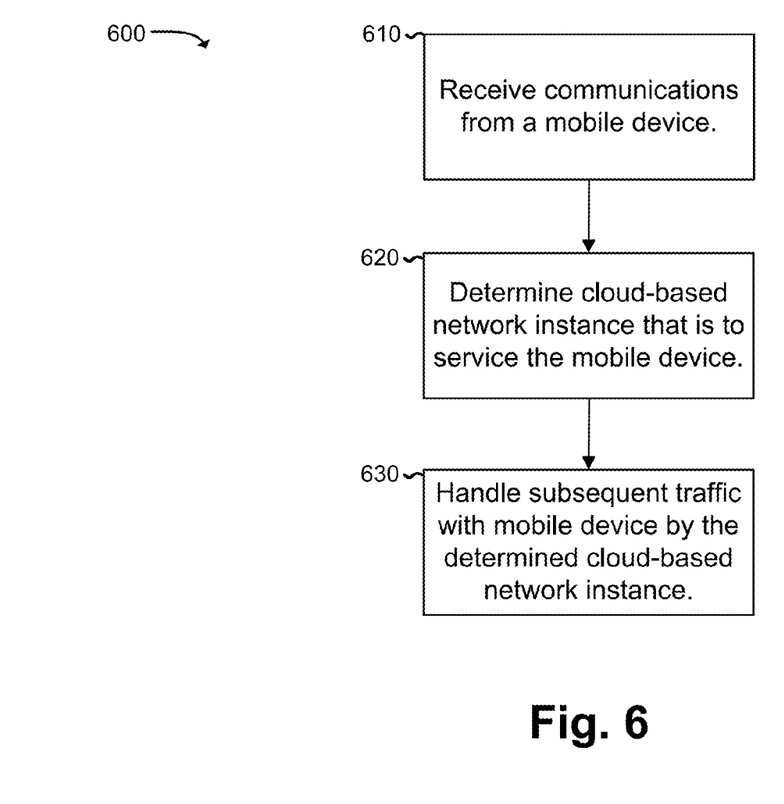
FIG. 6 is a flow chart illustrating an example process for operating cloud-based telecommunications infrastructure.

FIG. 6 is a flow chart illustrating an example process 600 for operating cloud-based telecommunications infrastructure. In one implementation, process 600 may be performed by MME proxy 230.

Process 600 may include receiving communications from a mobile device (block 610). A mobile device 210 may, for example, connect to a base station 225, which may be configured to connect to MME proxy 230 as part of, for example, initial attachment of mobile device 210 to telecommunications network 220.

Process 600 may further include determining the cloud-based network instance that is to service the connecting mobile device (block 620). In some implementations, MME proxy 230, in response to attachment of mobile device 210, may access a database, such as a database maintained by HSS 515, to determine a cloud-based network instance 240 that is to service mobile device 210. For example, and as previously discussed, based on account information corresponding to a mobile device 210, such as an account type, customer type, traffic or application/service class, or other information, MME proxy 230 may determine the cloud-based network instance 240 that is to handle traffic from the mobile device. In some implementations, MME proxy 230 may take other factors into consideration when determining the cloud-based network instance 240 for mobile device 210. For example, the relative load of different cloud-based network instances 240 may be used by MME proxy 230 in making the determination. Other factors that may be used by MME proxy 230 may include: a user subscription level (e.g., gold, silver, bronze), time (e.g., time of day), date (e.g., date of the year or season), user location (e.g., shopping center, stadium, etc.), type of radio access network, parameters relating to a device of the user (e.g., codec's supported), and/or application type (gaming, surfing, video, etc.).

Process 600 may further include handling subsequent traffic, with mobile device 210, by the determined cloud-based network instance (block 630). For instance, MME proxy 230 may route or otherwise direct subsequent network traffic to the determined cloud-based network instance 240 (e.g., to one or more hardware devices that implement cloud-based network instance 240).

Figure 7:
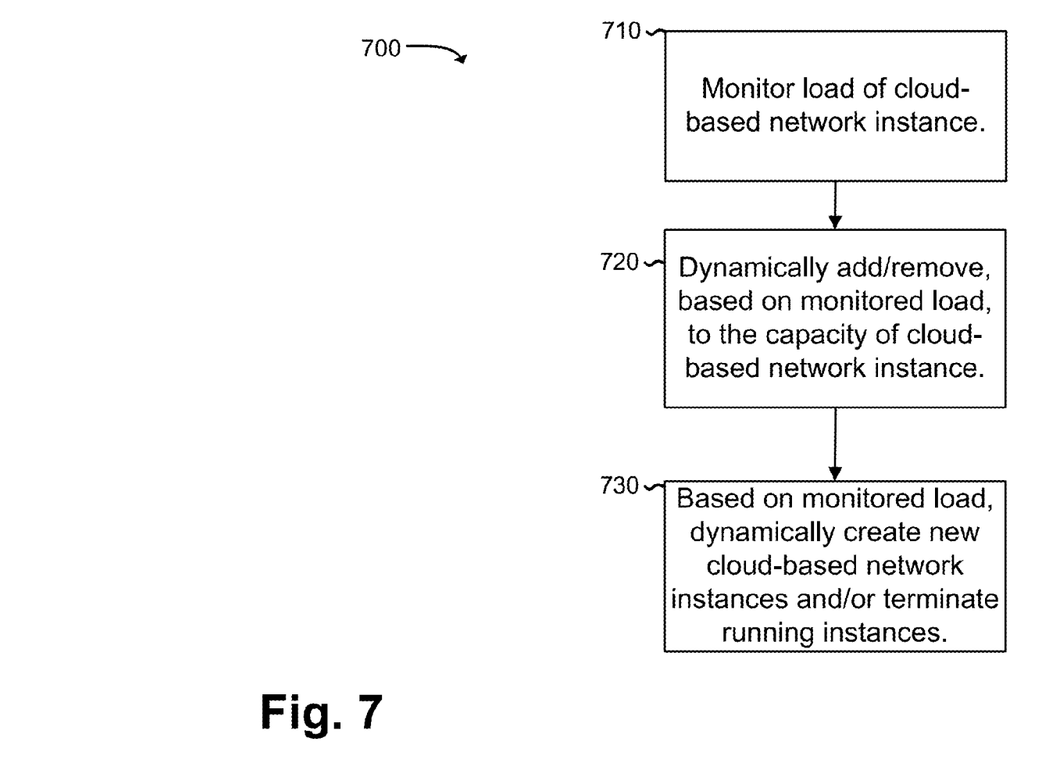
FIG. 7 is a flow chart illustrating an example process for managing cloud-based network instances.

FIG. 7 is a flow chart illustrating an example process 700 for managing cloud-based network instances. In one implementation, process 700 may be performed by MME proxy 230 and/or cloud management component 250.

Process 700 may include monitoring the load of cloud-based network instances (block 710). For example, cloud management component 250 may monitor each of cloud-based network instances 240 to determine whether any of cloud-based network instances 240 are overloaded. An overloaded cloud-based network instance may be one in which, for example, processors associated with the cloud-based network instance are at full capacity, latency associated with the functionality of the cloud-based network (e.g., the operation of MME 242, SGW 244, PGW 246, or HSS 248) is too high, the bandwidth associated with the functionality of the cloud-based network (e.g., the operation of MME 242, SGW 244, PGW 246, or HSS 248) is not sufficient to handle the available traffic, or other factors that may indicate that the cloud-based network instance is overloaded.

Process 700 may further include dynamically adding or removing, based on the monitored load, to the capacity of cloud-based network instances 240 (block 720). For example, a cloud provider may provide an application program interface (API) through which an application can programmatically add or remove computing resources (e.g., the processing or storage capacity of a cloud service) to cloud-based network instances 240. Cloud management component 250 may use such an API to dynamically add or remove computing resources to the computing resources that are used to host cloud-based network instances 240. Cloud management component 250 may, for example, add computing resources to an overloaded cloud-based network instance 240 and/or in some situations, may remove computing resources (e.g., to reduce cost) from a cloud-based network instance 240 that is being underutilized.

Process 700 may further include, based on the monitored load, dynamically creating cloud-based network instances and/or terminating running cloud-based network instances (block 730). For example, cloud management component 250 may initiate a new cloud-based network instance, possibly at a new or geographically distant data center, as needed. In some situations, cloud management component 250 may also terminate cloud-based network instances 240, such as a cloud-based network instance that is not being used or that is experiencing errors. Terminating a cloud-based network instance may correspond to de-allocating all computing resources that were previously allocated to service a particular cloud-based network instance 240.

As an example of the operation of processes 600 and 700 in the context of environment 400 (FIG. 4), assume that a non-cloud based network instance 405 is servicing a particular geographic area (e.g., a portion of the city of Philadelphia). Further, assume that non-cloud-based network instance 405 experiences service disruptions, due to, for example, natural disaster, planned equipment upgrades, or unplanned equipment failure. Cloud management component 250, either automatically or in response to commands entered by a network administrator, may create a new cloud-based network instance (e.g., one of cloud-based network instances 240) to handle the load of non-cloud based network instance 405. Network attachment requests from mobile devices may subsequently be directed to the new cloud-based network instance. At some point, non-cloud-based network instance 405 may be back in operation. New network attachment requests from mobile devices may then be routed back to non-cloud-based network instance 405. The new cloud-based network instance may no longer be needed, and cloud management component 250 may terminate the new cloud-based network instance.

Figure 8:
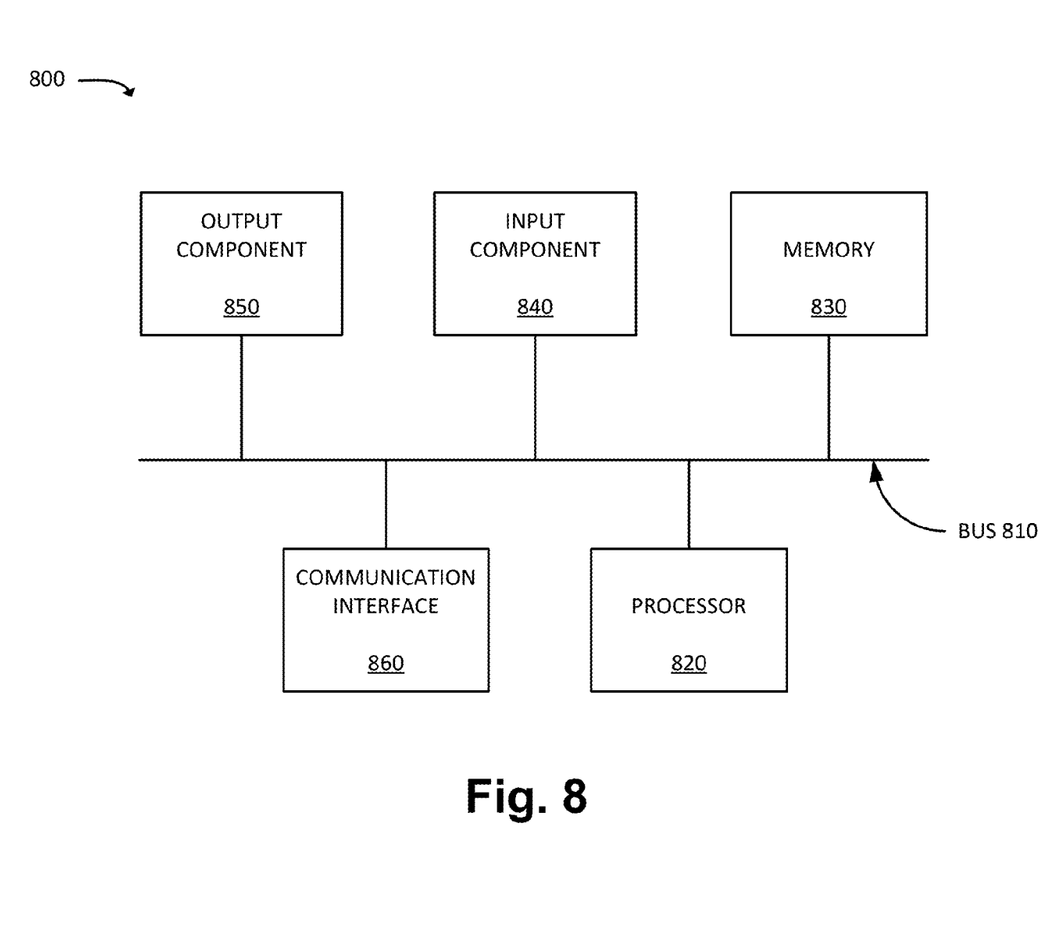
FIG. 8 is a diagram of example components of a device.

FIG. 8 is a diagram of example components of a device 800. Each of the devices illustrated in FIGS. 1-5 may include one or more devices 800. Device 800 may include bus 810, processor 820, memory 830, input component 840, output component 850, and communication interface 860. In another implementation, device 800 may include additional, fewer, different, or differently arranged components. Some non-limiting examples of device 800, with additional and/or different components, are discussed below.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to the operations described herein. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to FIGS. 6 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method comprising:
   receiving, by a proxy mobility management entity (MME), a request, from a mobile device, to use services of a telecommunications network, the proxy MME providing functionality, for the telecommunications network, at least relating to mobile device authentication and bearer activation and deactivation services;
   selecting, by the proxy MME, from a plurality of cloud-based network instances that each provide functionality of telecommunications network resources, one of the plurality of cloud-based network instances to service the mobile device, each of the cloud-based instances including functionality associated at least with a serving gateway (SGW) and a packet data network gateway (PGW) for the telecommunications network; and
   routing, by the proxy MME, communications with the mobile device through the selected cloud-based network instance.

2. The method of claim 1, wherein the cloud-based network instances each provide functionality of network devices in a Long Term Evolution (LTE) network.

3. The method of claim 1, wherein the plurality of cloud-based network instances are implemented at data centers that are located remotely from a base station that services the mobile device.

4. The method of claim 1, wherein the selecting of the one of the plurality of cloud-based network instances further includes:
   selecting the one of the plurality of cloud-based network instances based on load associated with the plurality of cloud-based network instances.

5. The method of claim 1, wherein the selecting of the one of the plurality of cloud-based network instances further includes:
   selecting the one of the plurality of cloud-based network instances based on at least one of a user subscription level, time, date, location of the mobile device, or type of radio access network associated with the mobile device.

6. The method of claim 1, wherein the selecting of the one of the plurality of cloud-based network instances further includes:
   looking up information, relating to the mobile device, via a request to a home subscriber server (HSS); and
   selecting the one of the plurality of cloud-based network instances based on the information looked-up via the HSS.

7. The method of claim 1, wherein each of the cloud-based instances additionally provide functionality associated with a second MME that provides mobile device idle mode tracking and paging and maintaining mobile device location information.

8. The method of claim 1, wherein the selection from the plurality of cloud-based network instances is performed in response to detection of a failure in a non-cloud-based network instance.

9. A proxy mobility management entity (MME) comprising processing logic to:
receive a request, from a mobile device, to use services of a telecommunications network, the proxy MME providing functionality, for the telecommunications network, at least relating to mobile device authentication and bearer activation and deactivation services;
select from a plurality of cloud-based network instances that each provide functionality of telecommunications network resources one of the plurality of cloud-based network instances to service the mobile device, each of the cloud-based instances including functionality associated at least with a serving gateway (SGW) and a packet data network gateway (PGW) for the telecommunications network; and
route communications with the mobile device through the selected cloud-based network instance.

10. The proxy MME of claim 9, wherein the cloud-based network instances each provide functionality of network devices in a Long Term Evolution (LTE) network.

11. The proxy MME of claim 9, further comprising processing logic to:
select the one of the plurality of cloud-based network instances based on load associated with the plurality of cloud-based network instances.

12. The proxy MME of claim 9, further comprising processing logic to:
look up information, relating to the mobile device, via a request to a home subscriber server (HSS); and
select the one of the plurality of cloud-based network instances based on the information looked-up via the HSS.

13. The proxy MME of claim 9, the cloud-based network instances each additionally provide functionality wherein associated with a second MME that provides mobile device idle mode tracking and paging, and maintaining mobile device location information.

14. The proxy MME of claim 9, wherein the selection from the plurality of cloud-based network instances is performed in response to detection of a failure in a non-cloud-based network instance.

15. A system comprising:
a plurality of cloud-based network instances to each provide functionality of telecommunications network resources to one or more devices; and
a proxy mobility management entity (MME) to provide functionality, for the telecommunications network, at least relating to authentication, and bearer activation and deactivation services, the proxy MME additionally to:
select, based on communications from a particular device, from the one or more devices, one of the plurality of cloud-based network instances to service the particular device, and
route communications associated with the particular device through the selected cloud-based network instances.

16. The system of claim 15, further comprising:
a cloud management component to:
monitor load experienced by the plurality of cloud-based network instances; and
create, based on the monitored load, one or more new cloud-based network instances.

17. The system of claim 16, wherein the cloud management component is further to:
expand, based on the monitored load, capacity of one or more of the cloud-based network instances.

18. The system of claim 15, wherein the plurality of cloud-based network instances each provide functionality of network devices in a Long Term Evolution (LTE) network.

19. The system of claim 18, wherein the cloud-based network instances each provide functionality corresponding to at least one of a serving gateway (SGW), or a packet data network gateway (PGW) in the LTE network.

20. The system of claim 15, wherein the proxy MME is further to select the one of the plurality of cloud-based network instances based on communications from the particular device that relate to initial attachment of the particular device to a network.

21. The system of claim 15, wherein each of the cloud-based instances additionally provide functionality associated with a second MME that provides mobile device idle mode tracking and paging, and maintaining mobile device location information.

* * * * *